United States Patent
Koshiishi (10) Patent No.: US 8,081,428 B2
(45) Date of Patent: Dec. 20, 2011

(54) HAND-HELD INFORMATION PROCESSING APPARATUS

(75) Inventor: Kazunori Koshiishi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 198 days.

(21) Appl. No.: 12/564,350

(22) Filed: Sep. 22, 2009

(65) Prior Publication Data

US 2010/0085693 A1 Apr. 8, 2010

(30) Foreign Application Priority Data

Oct. 3, 2008 (JP) ................................. 2008-258055

(51) Int. Cl.
*H05K 5/00* (2006.01)
*H05K 7/00* (2006.01)

(52) U.S. Cl. ......... 361/679.02; 361/679.01; 361/679.21; 361/679.22; 361/679.26; 361/679.55; 361/679.56; 455/575.1; 455/575.2; 455/575.3; 455/575.4; 455/575.5; 455/575.6; 455/575.7; 455/575.8; 455/575.9

(58) Field of Classification Search ............. 361/679.01, 361/679.02, 679.21, 679.22, 679.26, 679.55, 361/679.56; 455/575.1–575.9
See application file for complete search history.

(56) References Cited

U.S. PATENT DOCUMENTS

| | | | |
|---|---|---|---|
| 6,011,699 A * | 1/2000 | Murray et al. | 361/814 |
| 7,292,227 B2 * | 11/2007 | Fukumoto et al. | 345/173 |
| 2004/0178989 A1 * | 9/2004 | Shahoian et al. | 345/156 |
| 2005/0176506 A1 | 8/2005 | Goto et al. | |
| 2009/0060490 A1 * | 3/2009 | Kuwahara et al. | 396/429 |

FOREIGN PATENT DOCUMENTS

| | | |
|---|---|---|
| EP | 0 834 338 | 4/1998 |
| EP | 0 835 676 | 4/1998 |
| EP | 1 757 345 | 2/2007 |
| ES | 2 231 856 | 5/2005 |
| JP | 11-009838 | 1/1999 |
| JP | 2004-193665 | 7/2004 |
| JP | 2007-104796 | 4/2007 |

* cited by examiner

*Primary Examiner* — Anthony Haughton
(74) *Attorney, Agent, or Firm* — Nixon & Vanderhye P.C.

(57) ABSTRACT

A game apparatus includes a vibrating motor, and the vibrating motor is arranged to be fit into a rib provided at approximately the center of a base cover of a lower housing. The rib is made up of an upper member and a lower member different in height, and the vibrating motor is secured to be sandwiched between a side surface of the lower member and a side surface of a rib of a motor cover to be attached to the base cover. Thus, a side surface of the vibrating motor is in intimate contact with the side surface of the lower member and the side surface of the rib of the motor cover.

5 Claims, 10 Drawing Sheets

(A) TOP VIEW (B) PERSPECTIVE VIEW

FIG. 7

(A) TOP VIEW (B) PERSPECTIVE VIEW

(A) PERSPECTIVE VIEW (B) VIEW ON PARTIALLY ENLARGED SCALE (C) WHEN RING-SHAPED RIBS 92 WITH SAME HEIGHT IS PROVIDED

FIG. 10

HAND-HELD INFORMATION PROCESSING APPARATUS

CROSS REFERENCE OF RELATED APPLICATION

The disclosure of Japanese Patent Application No. 2008-258055 is incorporated herein by reference.

BACKGROUND OF THE INVENTION

Technical Field

The technology presented herein relates to a hand-held information processing apparatus. More specifically, the present technology relates to a hand-held information processing apparatus, such as a hand-held game apparatus, a game controller, a PDA, a hand-held sound recording and reproducing apparatus, an electronic data book, and a cellular phone.

Background and Summary

One example of the related art is disclosed in Japanese Patent Laid-open No. 11-9838 [A63F 9/22, G06F 3/033] (Document 1) laid-open on Jan. 19, 1999. In a housing of a computer game controller disclosed in the Document 1, a grip portion extending toward the front from both of the right and left sides is provided, and inside a tip end of the grip portion, a vibration device is contained. The vibration device is configured to attach a helical spring to a rotating shaft of a direct-current motor, and to attach a weight at an end of the helical spring. Furthermore, the direct-current motor is inserted into a motor mounting portion integrally formed with the housing, being bonded with a sponge on its outer surface.

In addition, another example of the related art is disclosed in Japanese Patent Application Laid-Open No. 2004-193625 [H04B 1/38, B06B 1/04, B06B 1/16, H02K 7/065, H04M 1/00] (Document 2) laid-open on Jul. 8, 2004. In a foldable hand-held machine disclosed in the Document 2, a vibrating motor is installed in a hinge portion.

However, in the art of the Document 1, the sponge bonded to the outer surface of the vibrating motor is disposed between the vibrating motor and the wall surface of the motor mounting portion, so that vibrations of the vibrating motor are absorbed by the sponge, and may not be fully transmitted to the housing.

Furthermore, in the art of the Document 2, it is disclosed that the coin-shaped vibrating motor is attached to the hinge portion by merely being raised and tilted, and is unclear how to install it or how to configure it. When the vibrating motor is raised to bring a side surface of the vibrating motor and an inner peripheral surface of the hinge portion in contact with each other, vibrations are directly transmitted to the hinge portion, but when the vibrating motor is tilted, the inner peripheral surface of the hinge portion and the outer peripheral surface of the vibrating motor are scarcely in contact with each other, and the vibrations seem to be hardly transmitted to the hinge portion.

SUMMARY OF THE INVENTION

Therefore, it is a primary feature of an example embodiment presented herein to provide a novel hand-held information processing apparatus.

Furthermore, another feature of the present embodiment is to provide a hand-held information processing apparatus capable of efficiently transmitting vibrations.

The present embodiment employs following features in order to solve the above-described problems. It should be noted that reference numerals and the supplements inside the parentheses show one example of a corresponding relationship with the embodiments described later, and do not limit the present embodiment.

A first embodiment is an hand-held information processing apparatus, and comprises: a coin-shaped vibrating motor; a housing provided with a first rib having an inclined side surface; and a cover provided with a second rib having a side surface which is opposed to be in parallel or approximately parallel with the side surface of the first rib for restraining the coin-shaped vibrating motor, wherein the cover is attached to the housing such that a side surface of the coin-shaped motor horizontally arranged is sandwiched between the side surface of the first rib and the side surface of the second rib.

In the first embodiment, a hand-held information processing apparatus (10) has a coin-shaped vibrating motor (66) for informing the user of various information, for example. The coin-shaped vibrating motor is horizontally arranged, and is sandwiched between a first rib (92, 922) of a housing (16*b*) and a second rib (1022) of a cover (100). The first rib has an inclined side surface (922*a*), and the second rib has a side surface (1022*b*) being opposed to be in parallel with or approximately parallel with the first rib, and when the cover is attached to the housing, a side surface of the coin-shaped vibrating motor is sandwiched to be brought into contact (intimate contact) with the side surface of the first rib and side surface of the second rib.

According to the first embodiment, the side surface of the coin-shaped vibrating motor is sandwiched to be brought into contact with the side surfaces of the ribs provided to the housing and the cover, so that it is possible to efficiently transmit vibrations to the housing.

In a second embodiment, the cover has a hook to be used for wiring of the coin-shaped vibrating motor.

In the second embodiment, the cover has a hook (104*a*) to be used for wiring of the coin-shaped vibrating motor. For example, the lead wire is bent, being hooked by the hook.

According to the second embodiment, the lead wire is bent by being hooked by the hook, making the wiring easy, and avoiding any inconvenience of the lead wire to the assembly of the game apparatus.

In a third embodiment the housing and the cover form a housing hole to house a pen for a touch panel.

In the third embodiment, the housing and the cover (100, 104) form a housing hole (52) to house a pen (50) for a touch panel (48).

According to the third embodiment, it is possible to configure the housing portion without increasing the number of components.

In a fourth embodiment the housing further includes a through-hole to pass through a pushed portion of a switch, and the cover further includes a holding portion to hold the switch.

In the fourth embodiment, the housing has a through-hole (96*e*) to pass through a pushed portion of a switch (46*f*). On the other hand, the cover has a holding portion (106*a*) to hold the switch. When the cover is attached to the housing, a holding portion is arranged at a position corresponding to the through-hole.

In the fourth embodiment, the switch can be configured to be held without increasing the number of components.

The above described features, aspects and advantages of the present embodiments will become more apparent from the following detailed description of the present embodiments when taken in conjunction with the accompanying drawings.

DETAILED DESCRIPTION OF THE PREFERRED EMBODIMENTS

Figure 1:
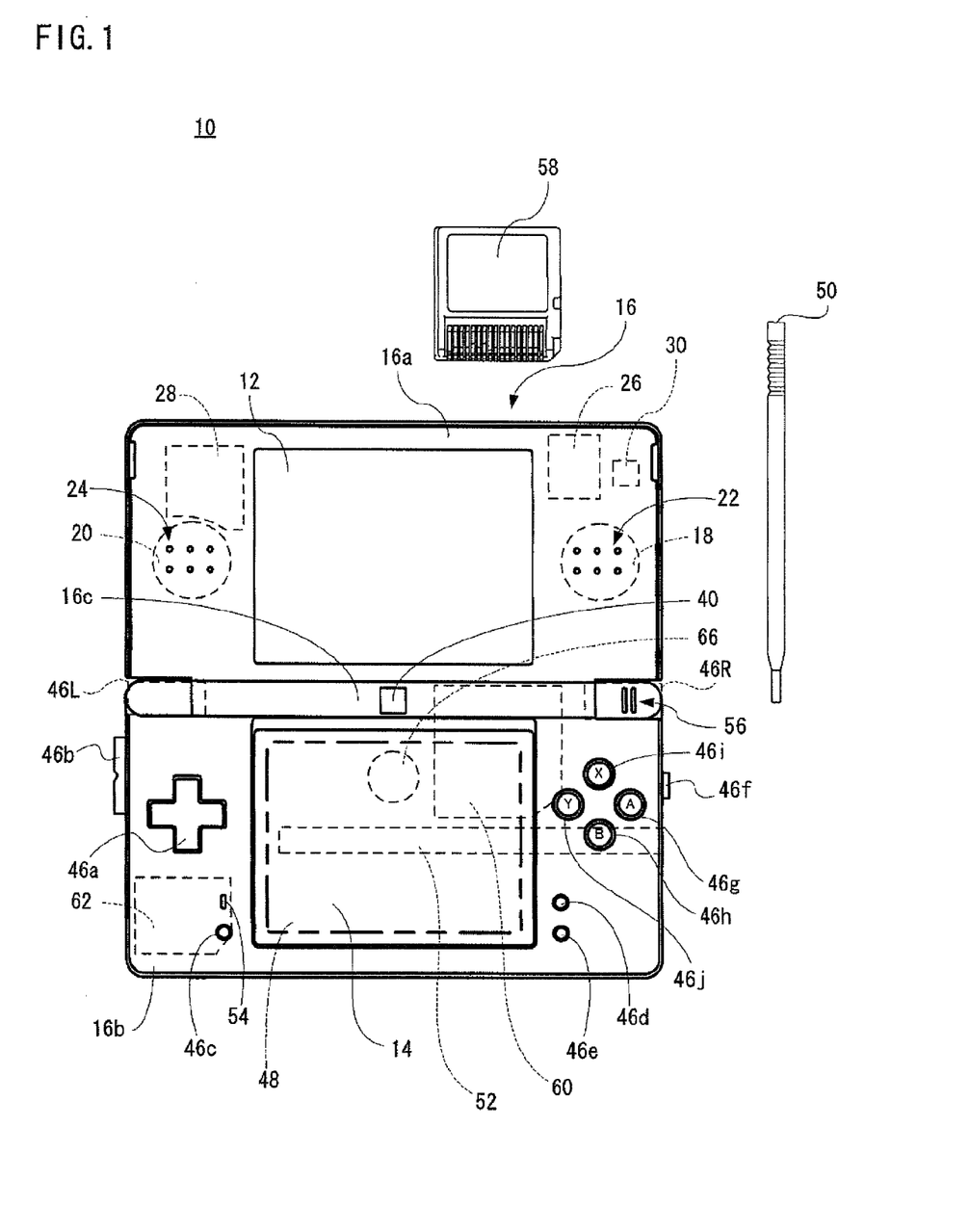
FIG. 1 is an illustrative view showing one embodiment of a game apparatus.

Referring to FIG. 1, a game apparatus 10 of one embodiment of the present embodiment includes a first liquid crystal display (LCD) 12 and a second LCD 14. The LCD 12 and LCD 14 are housed in a housing 16 so as to be in predetermined arrangement positions. In this embodiment, the housing 16 comprises an upper housing 16a, a lower housing 16b, and a hinge portion 16c. The LCD 12 is housed in the upper housing 16a, and the LCD 14 is housed in the lower housing 16b. Accordingly, the LCD 12 and the LCD 14 are placed in proximity to each other to be vertically (up and down) arranged.

It should be noted that in this embodiment, although an LCD is utilized as a display in this embodiment, an EL (Electronic Luminescence) display, a plasmatic display, etc. may be used in place of the LCD.

The upper housing 16a and the lower housing 16b are rotatably connected at a lower side (lower edge) of the upper housing 16a and an upper side (upper edge) of the lower housing 16b by the hinge portion 16c. Accordingly, in a case that a game is not played, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged, such as a flaw, etc.

As understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape being approximately the same as the upper housing 16a, and has an opening formed so as to expose a display surface of the LCD 14 at an approximately center.

Figure 2:
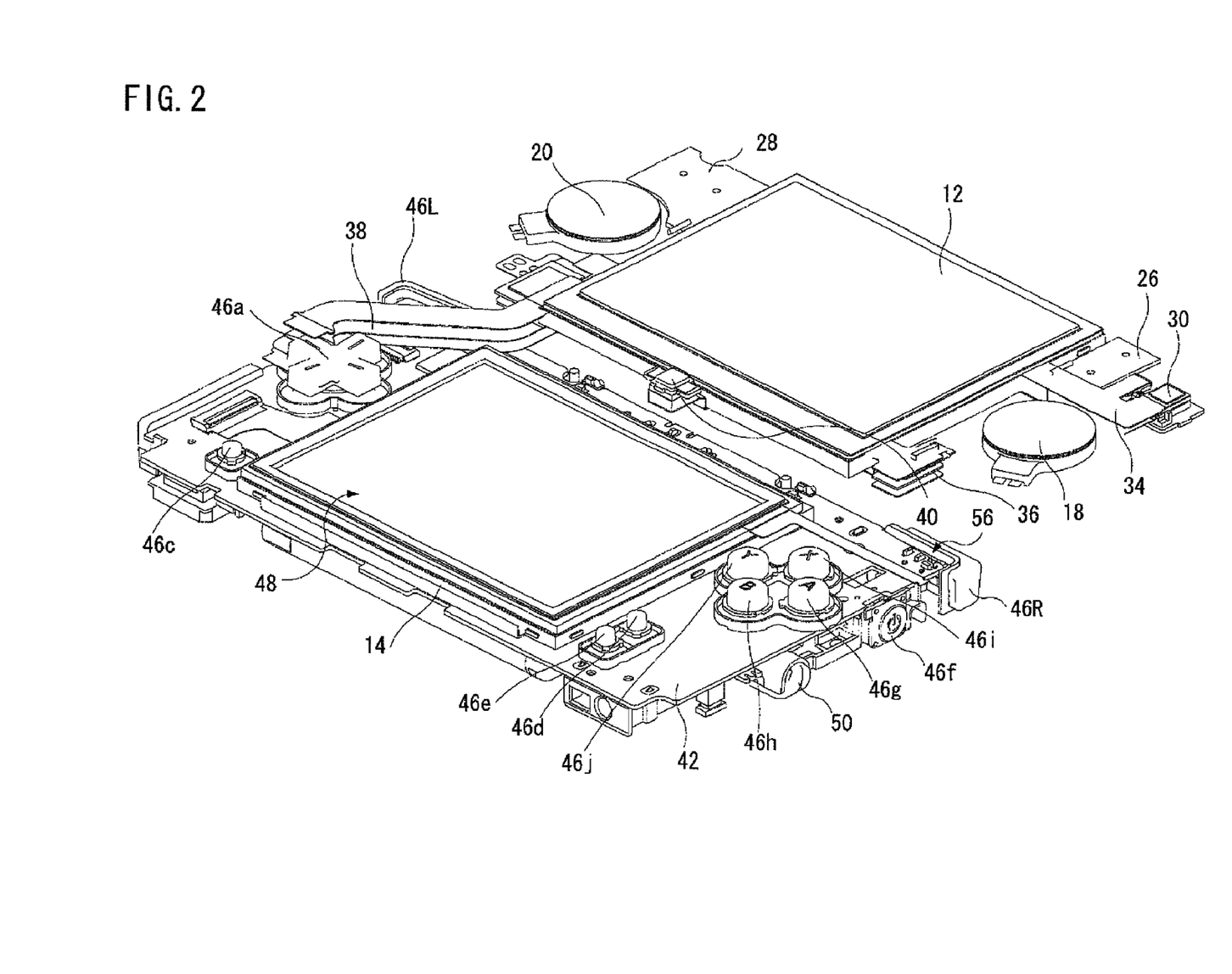
FIG. 2 shows a placement of respective components except for the housing inside the game apparatus shown in FIG. 1, and is a perspective view of the game apparatus in an opened state when seeing a front surface from obliquely upward.

Furthermore, as shown in FIG. 2, inside the upper housing 16a, a right speaker 18 and a left speaker 20 are arranged on both sides of the LCD 12. Accordingly, as shown in FIG. 1, the upper housing 16a is formed with a sound releasing hole 22 and a sound releasing hole 24 for respectively producing sound from the speakers 18, 20 at positions corresponding to the right speaker 18 and the left speaker 20.

It should be noted that FIG. 2 shows a placement of respective components except for the housing 16 inside the game apparatus 10 shown in FIG. 1, and is a perspective view of the game apparatus 10 in an opened state when seeing a front surface from obliquely upward.

Figure 3:
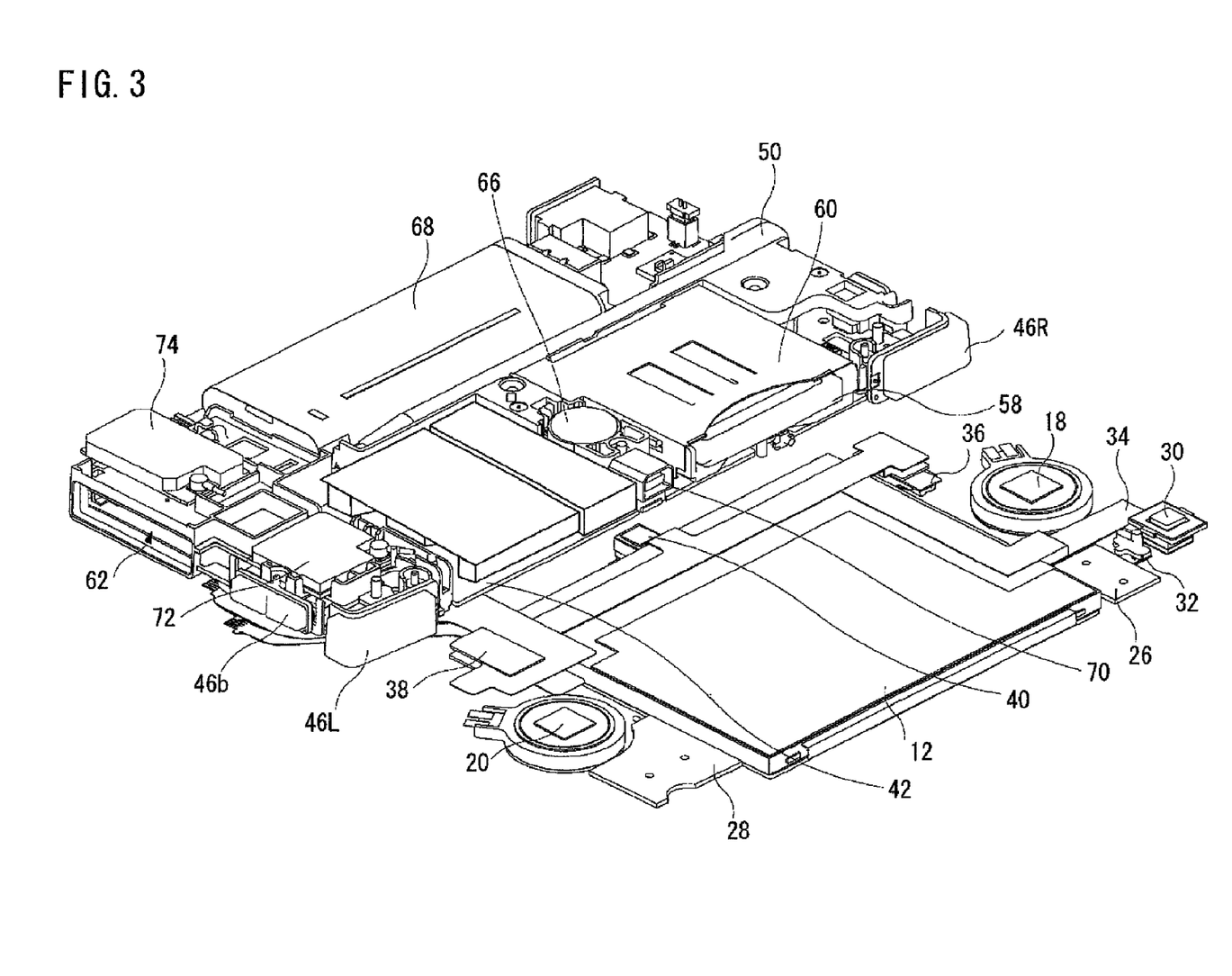
FIG. 3 shows a placement of the respective components except for the housing inside the game apparatus shown in FIG. 1, and is a perspective view of the game apparatus in an opened state when seeing a rear surface from obliquely upward.

In addition, as shown in FIG. 1 and FIG. 2, inside the upper housing 16a, on both sides of the LCD 12, an antenna 26 and an antenna 28 for wireless communication are respectively arranged above the speaker 18 and speaker 20. Moreover, as shown in FIG. 1-FIG. 3, inside the upper housing 16a, next to the antenna 26, a camera 30 is arranged. Furthermore, as well understood from FIG. 3, between the antenna 26 and the camera 30, an LED 32 is provided.

Here, FIG. 3 shows a placement of respective components except for the housing 16 inside the game apparatus 10 shown in FIG. 1, and is a perspective view of the game apparatus 10 in an opened state when seeing a rear surface from obliquely upward.

Furthermore, as well understood from FIG. 3, an imaging portion (imaging surface) of the camera 30 and a light emitting surface of the LED 32 are provided on a rear surface of the upper housing 16a shown in FIG. 1. For example, the camera 30 is arranged such that the imaging surface is flush with the rear surface of the upper housing 16a. This camera 30 can image a face of another player, etc. existing in a position being face to face with the player utilizing the game apparatus 10. Surely, it is possible to image a landscape, etc. with the camera 30.

The LED 32 is used for indicating a situation of the camera 30 (active/inactive). For example, if the camera 30 is active, the LED 32 is turned on (lights up) while if the camera 30 is inactive, the LED 32 is turned off (light out). Furthermore, in imaging by a self-timer, by flashing the LED 32 and gradually making time intervals between lighting and extinction shorter, it is possible to inform the player that an imaging timing approaches.

Figure 4:
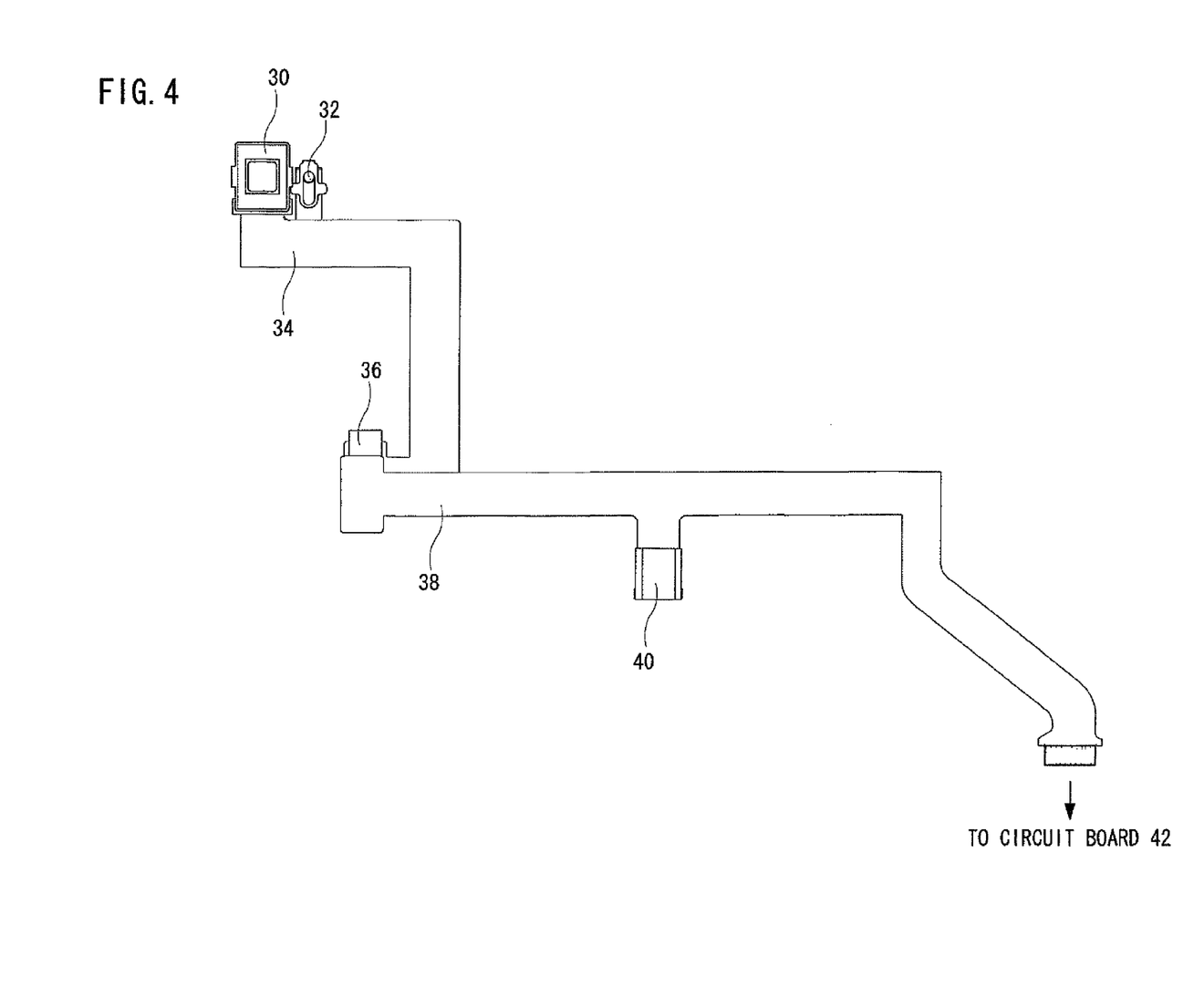
FIG. 4 is an illustrative view showing a connected state of two cameras shown in FIG. 1-FIG. 3.

As shown in FIG. 3 and FIG. 4, the camera 30 and the LED 32 are mounted on a flexible substrate 34, and the flexible substrate 34 is connected to another flexible substrate 38 via BtoB connector 36. The flexible substrate 38 is mounted with another camera 40, and extends to the lower housing 16b so as to be connected to a circuit board 42.

The reason why the cameras 30, 40 are mounted on the separate flexible substrates 34, 38 is that the number of wires in the flexible cable can be increased, and it is easy to bend the flexible cable in comparison to a case that these cameras 30, 40 are mounted on a common substrate. Moreover, in a case that the two cameras are mounted on a common flexible substrate, if any one of them is broken, both of the cameras have to be replaced, resulting in increase in cost. Furthermore, a thin connector like the BtoB connector 36 is used, so that even if the two flexible substrates 34, 38 are used, they are not bulky, so that the game apparatus 10 never becomes unnecessarily large (thick).

Additionally, as shown in FIG. 2 and FIG. 3, the flexible substrate 34 is connected to the LCD 12, extending to the lower housing 16*b* so as to be superposed on the above-described flexible substrate 38, to be connected to the circuit board 42.

Figure 5:
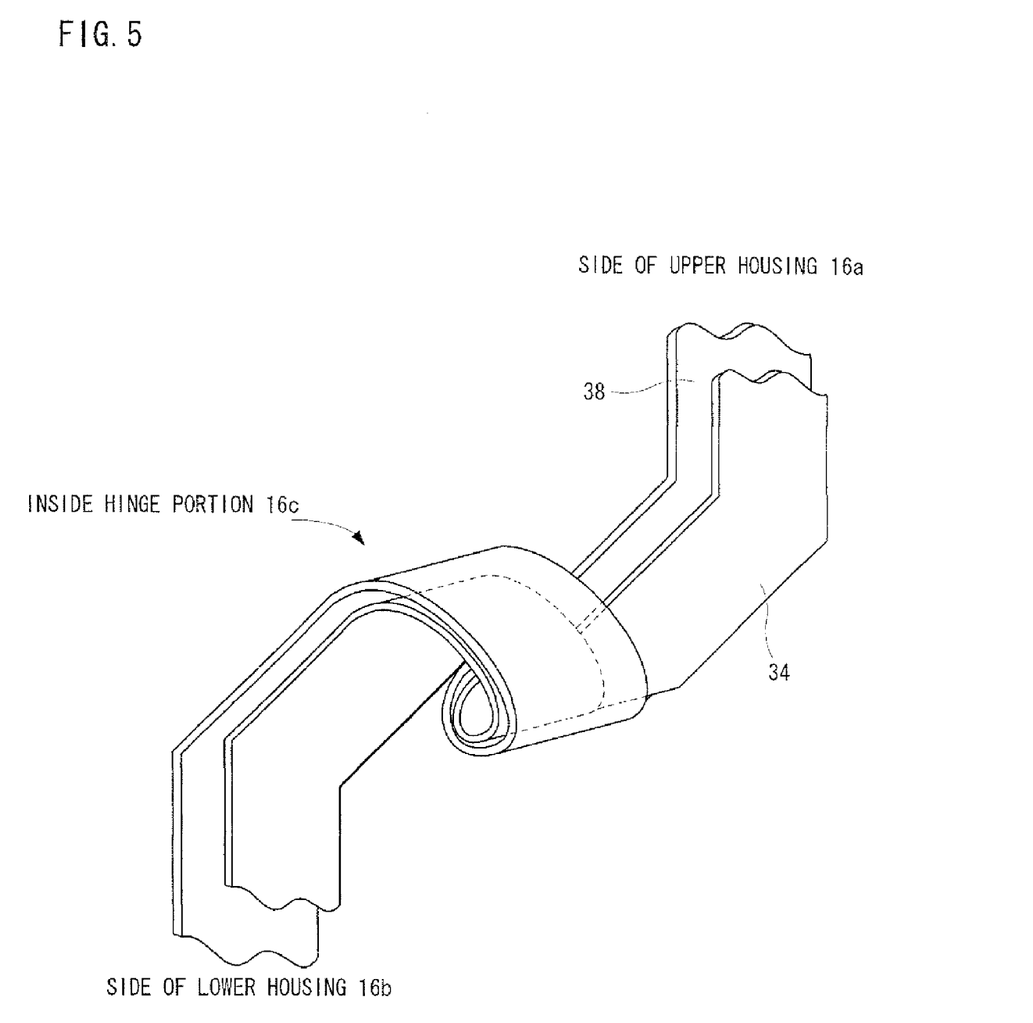
FIG. 5 is an illustrative view in which a flexible substrate is spirally bent from an upper housing to a lower housing.

Although in FIG. 2 and FIG. 3, the flexible substrate 34 and the flexible substrate 38 are illustrated linearly, but in reality, they are spirally wound once in a superposed state inside the hinge portion 16*c*, and extend to the lower housing 16*b* as shown in FIG. 5. Accordingly, in a case that the game apparatus 10 is opened or closed, the radius of the flexible substrate 34, 38 at the spirally wounded part is changed. This makes it possible to prevent the flexible substrates 34, 38 from becoming crimped and from being subjected to more stress than is required, resulting in the prevention of a break in wire.

Returning to FIG. 1, the lower housing 16*b* is provided with an operating switch 46. The operating switch 46 includes various switches and buttons. More specifically, the operating switch 46 includes a direction instructing switch (cross switch) 46*a*, a volume switch 46*b*, a reset switch 46*c*, a start switch 46*d*, a select switch 46*e*, a power button 46*f*, an action switch (A button) 46*g*, an action switch (B button) 46*h*, an action switch (X button) 46*i*, an action switch (Y button) 46*j*, an action switch (L button) 46L, and an action switch (R button) 46R.

Furthermore, as well understood from FIG. 1 to FIG. 3, the switches 46*a* and 46*c* are arranged on the one surface of the lower housing 16*b*, and at the left of the LCD 14. Additionally, the switch 46*b* is arranged on a left side surface of the lower housing 16*b*, and the switch 46*f* is arranged on a right side surface of the lower housing 16*b*. In addition, the switches 46*d*, 46*e*, 46*g*-46*j* are arranged on the one surface of the lower housing 16*b*, and at the right of the LCD 14. Then, the switch 46L and the switch 46R are arranged at right and left corners (right and left ends) of the upper (top side) surface of the lower housing 16*b* so as to be superposed on the hinge portion 16*c*.

Here, as shown in FIG. 2, the cross switch 46*a*, the reset switch 46*c*, the start switch 46*d*, the select switch 46*e*, the A button 46*g*, the B button 46*h*, the X button 46*i* and the Y button 46*j* are mounted on the circuit board 42.

The cross switch 46*a* functions as a digital joystick, and is utilized for instructing a moving direction of a player character (or player object) to be operated by a user or a player and instructing a traveling direction of a cursor, and so forth by operating any one of four depression portions, and so forth. Also, a specific role can be assigned to each of the four depression portions, and by operating any one of the four depression portions, it is possible to instruct (designate) the assigned role.

The volume switch 46*b* is constructed of two push buttons, and utilized for adjusting loudness of sound (voice) output from the right speaker 18 and the left speaker 20. In this embodiment, the volume switch 46*b* is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

The reset switch 46*c* is formed of a push button, and utilized for resetting (restarting) game processing and another information processing. The start switch 46*d* is formed of a push button, and used for starting (restarting), and pausing the game, etc. The select switch 46*e* is formed of a push button, and is utilized for a game mode selection, a menu selection, etc. The power button 46*f* is formed of a push button, and utilized for turning on/off the main power supply of the game apparatus 10.

The action switch 46*g*, that is, the A button is formed of the push button, and is utilized for causing the player character to take an action other than that instructed by a directional instruction, specifically arbitrary actions such as hitting (punching), throwing, grasping (acquiring), riding, and jumping, etc. For example, in an action game, it is possible to apply an instruction of jumping, punching, moving arms, etc. Moreover, in a roll playing game (RPG) and a simulation RPG, it is possible to instruct to acquire an item, select and determine a weapon and a command, and so forth. The action switch 46*h*, that is, the B button is formed by the push button, and is utilized for changing a game mode selected by the select switch 46*e*, canceling an action determined by the A button 46*g*, and so forth.

The action switch 46*i*, that is, the X button, and the action switch, 46*j*, that is, the Y button are formed of push buttons, and utilized for subsidiary operations when the game cannot be advanced only with the A button 46*g* and B button 46*h*. However, the X button 46*i* and the Y button 46*j* can be used for the operations the same as the A button 46*g* and the B button 46*h*. Surely, the X button 46*i* and the Y button 46*j* are not necessarily used in the game playing.

The action switch 46L, that is, the left push button, and the action switch 46R, that is, the right push button are formed by push buttons. The left push button (L button) 46L and the right push button (R button) 46R can be used for the operation the same as A button 46*g* and the B button 46*h*, and can also be used for subsidiary operations of the A button 46*g* and the B button 46*h*. In addition, the L button 46L and the R button 46R can change roles assigned to the direction switch 46*a*, the A button 46*g*, the B button 46*h*, the X button 46*i* and the Y button 46*3* to different roles.

Furthermore, on the top surface of the LCD 14, a touch panel 48 is provided. As the touch panel 48, any kinds of a resistance film system, an optical system (infrared rays system) and an electrostatic capacitive coupling system, for example, can be utilized. In response to an operation (touch operation) by depressing, stroking, touching, and so forth with a stick 50, a pen (stylus pen), or a finger (hereinafter, referred to as "stick 50, etc.") on a top surface of the touch panel 48, the touch panel 48 detects coordinates of an operated position by the stick 50, etc. to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 48 is also rendered 256 dots×192 dots in correspondence to the resolution of the display surface. However, the detection accuracy of the touch panel 48 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, maps, characters such as, a player character, etc. are displayed on the one LCD, and items belonging to the player object may be displayed on the other LCD. Additionally, an operation screen (game screen) of the game can be displayed on the one LCD, and another game screen including information (score, level, etc.) in relation to the game can be displayed on the other LCD. Furthermore, by utilizing the two LCD 12 and LCD 14 as one screen, it is possible to display a large monster (enemy object) to be defeated by the player object.

Accordingly, the player is able to designate (operate) an image, such as a player character, an enemy character, an item character, an operating object, etc. to be displayed on the screen of the LCD 14 and select (input) commands by operating the touch panel 48 with the use of the stick 50, etc. Also, it is possible to change the direction of a virtual camera (viewpoint) (direction of the line of sight) provided in the three-dimensional game space, and instruct a scrolling (gradual moving display) direction of the game screen (map).

Additionally, depending on the kind of the game, other input instructions can be made with the use of the touch panel 48. For example, it is possible to input by hand words, numbers, symbols, etc. on the LCD 14 with the use of the touch panel 48.

Thus, the game apparatus 10 has the LCD 12 and the LCD 14 as a display portion of two screens, and by providing the touch panel 48 on the top surface of any one of them (LCD 14 in this embodiment), the game apparatus 10 has the two screens (12, 14) and the operating portions (46, 48) of two kinds.

Furthermore, the lower housing 16*b* is provided with a housing hole 52, and when the stick 50 is not used, the stick 50 is housed in the housing hole 52 as shown in FIG. 2 and FIG. 3.

In addition, although illustration is omitted, inside the lower housing 16*b*, a microphone is provided above the reset switch 46*c*, and at the position corresponding to the microphone, a microphone hole 54 is formed. Furthermore, the above-described camera 40 is provided at approximately the center of the hinge portion 16*c* such that the imaging portion (imaging surface) is exposed. In this embodiment, the camera 40 is arranged such that its imaging surface is in parallel with the display surfaces of the LCDs 12, 14 when the game apparatus 10 is opened (each of the upper housing 16*a* and the lower housing 16*b* is opened). Accordingly, the camera 40 can image a face of the player utilizing the game apparatus 10, for example.

Furthermore, at the right end of the hinge portion 16*c*, an indicator 56 is provided. The indicator 56 is made up of a plurality of LEDs mounted on the circuit board 42 as shown in FIG. 2, and shows remaining battery level and the presence or absence of a communication. As shown in FIG. 1, the indicator 56 has two display portions, and the left display portion indicates the remaining battery level, and the right display portion indicates the presence or absence of a communication. The remaining battery level can be represented by a color of an emitting LED. If the remaining battery level is enough (the charge is equal to or more than 70% when a full-charged state is 100%), the green color LED lights up. That is, the display portion lights up in green. Alternatively, if the remaining battery level becomes relatively low (the charge is equal to or more than 30% and less than 70% with respect to the full-charged state), the green LED and the red LED light up. That is, the display portion light up in orange. Still alternatively, if the remaining battery level is remarkably low (the charge is less than 30% with respect to the full-charged state), the red LED lights up. Additionally, the presence or absence of the communication can be represented by flashing the LED. In a case that a communication is established, the green LED flashes, and in a case that a communication is not established, the LED lights out.

Returning to FIG. 1, the game apparatus 10 includes a memory card (or cartridge) 58. Although illustration is omitted, the memory card 58 has a ROM storing a program of an arbitrary application like a virtual game and data like image data, and sound data to be used in this application, and a RAM for storing (saving) data (proceeding data and result data) generated by executing the application with the game apparatus 10. The memory card 58 can be attached to and detached from the game apparatus 10, and is inserted to a card slot 60 provided to the lower housing 16*b* as shown in FIG. 3. In this embodiment, the insertion opening of the card slot 60 is provided on an upper surface (top side surface) of the lower housing 16*b*.

Although omitted in FIG. 1 to FIG. 3, a connector 304 (see FIG. 10) is provided at a depth portion of the card slot 60 to be connected to a connector (not shown) provided at an end portion of the memory card 58 in the loading direction, and when the memory card 58 is loaded into the card slot 60, the connectors are connected with each other, so that the memory card 58 is accessible by a CPU core 300 (see FIG. 10) of the game apparatus 10.

Moreover, as shown in FIG. 3, the game apparatus 10 is provided with a card slot 62 on the left side surface of the lower housing 16*b*. In this embodiment, the insertion opening for the card slot 62 is provided at the left side surface of the lower housing 16*b*, and below the volume switch 46*b*. To this card slot 62, a memory card (SD card 64 in this embodiment) different from the memory card 58 can be inserted. The SD card 64 is mainly used as a backup memory of the game data. Meanwhile, the data (game data, image (photograph) data, sound data, etc.) acquired from the information processing apparatus like another game apparatus 10, etc. is stored in the SD card 64, and by attaching the SD card 64 to the game apparatus 10, the data can also be utilized in the game apparatus 10.

Here, in this embodiment, the SD card 64 is used, but another memory card, such as a mini SD card, a CompactFlash (registered trademark), a SmartMedia (registered trademark), a Magic Gate (registered trademark) Memory Stick, a MultiMediaCard (registered trademark), etc. may be utilized.

Furthermore, in the game apparatus 10, a vibrating motor 66 is provided inside the lower housing 16*b*. In this embodiment, the vibrating motor 66 is formed at approximately the center of the horizontal direction of the lower housing 16*b*, and slightly upper elevation than the center in the vertical direction. The vibrating motor 66 takes a shape of a button (cylinder), and contains an eccentric shaft not shown. Thus, when the vibrating motor 66 is driven, the vibration is transmitted through the game apparatus 10 to the player holding this.

The reason why the vibrating motor 66 is arranged in such a position is that in a case that the player holds the game apparatus 10 with both hands with the LCD 12 and the LCD 14 vertically arranged as shown in FIG. 1, vibrations are uniformly and efficiently transmitted to both of the hands. Although illustration is omitted, because even if the player holds the game apparatus 10 with both hands with the LCD 12 and the LCD 14 horizontally arranged (a situation in which the game apparatus 12 shown in FIG. 1 is rotated clockwise or counterclockwise by 90 degrees), an advantage similar to the above description is acquired.

Figure 6:
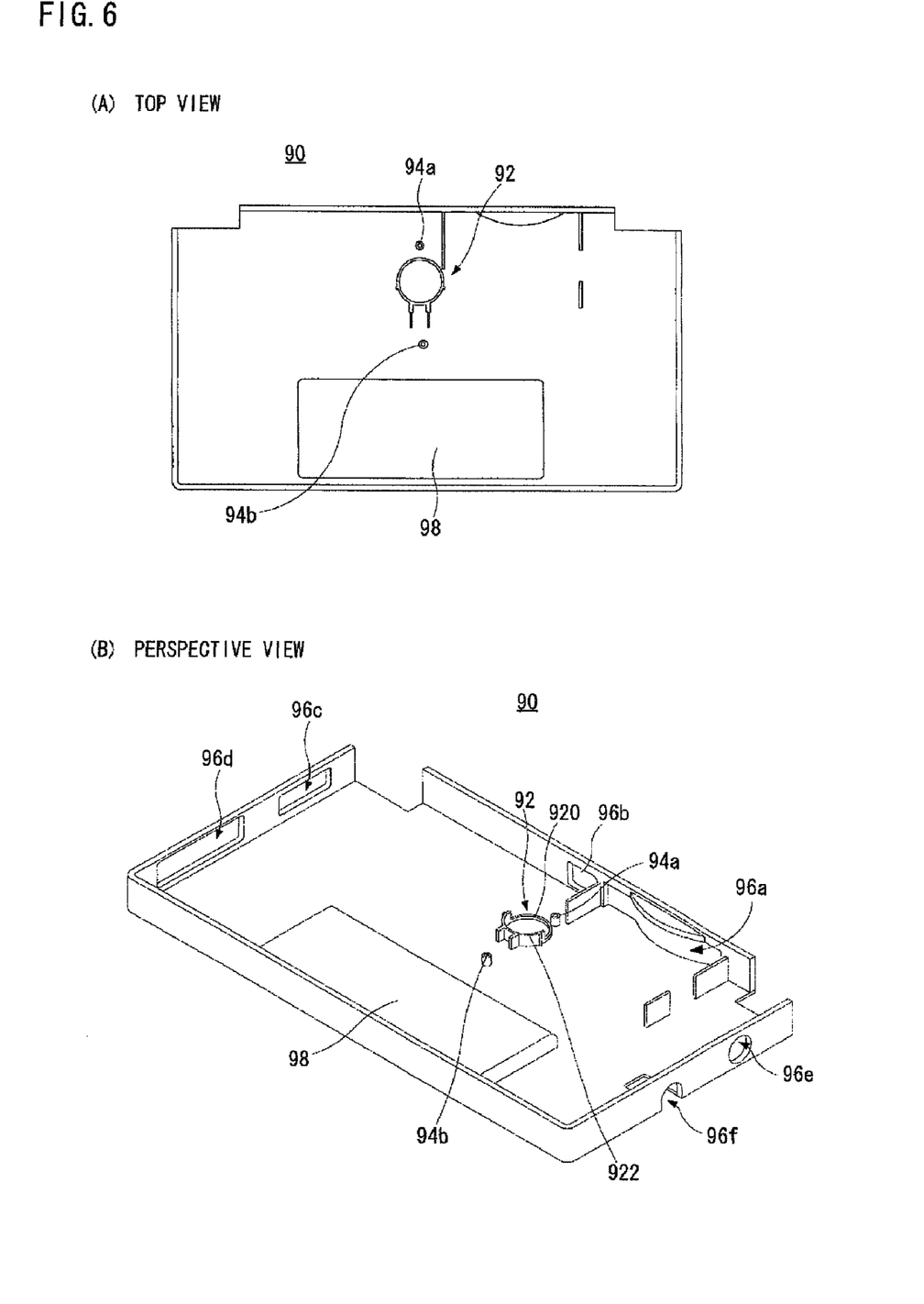
FIG. 6 is an illustrative view showing a configuration of a base cover of the lower housing.

Furthermore, as shown in FIG. 3, on the rear surface of the lower housing 16*b*, a battery 68 is provided below the card slot 60. Strictly speaking, the battery 68 is housed in a battery housing box 98 provided in the base cover 90 (see FIG. 6(A), (B)) formed of the lower housing 16*b* as described later. In addition, an externally-expanding connector 70 is provided on the upper surface of the lower housing 16*b* and above the vibrating motor 66. The insertion opening 96*b* of the externally-expanding connector 70 is approximately the center of the upper surface of the lower housing 16*b* and next to an insertion opening 96*a* of the card slot 60 (see FIG. 6(B)). The externally-expanding connector 70 can be connected with an adaptor for power supply which is capable of being used when the above-described battery 68 is charged.

Furthermore, as shown in FIG. 3, inside the lower housing 16*b*, a first wireless communication unit 72 is provided next to the volume switch 46*b*. In addition, below the first wireless communication unit 72, a second wireless communication unit 74 is provided at a position superposed with the card slot 62. In this embodiment, the first wireless communication unit 72 and the second wireless communication unit 74 are wireless modules different in format. For example, a wireless LAN (Wi-Fi) module and a Bluetooth (registered trademark) module can be utilized.

In such a game apparatus 10, various information is suggested by transmitting vibrations from the vibrating motor 66 to the user or the player through the game apparatus 10. A notification from the game apparatus 10 to the player is transmitted by vibrations, such as transmission of an impact when the player is attacked from an enemy character during the game, notification of one's turn in an alternate communication game.

However, provision of the vibrating motor 66 makes the size of the game apparatus 10 large and detracts a low profile design, and vibrations may not be fully transmitted to the case according to how to arrange the vibrating motors.

Thus, the game apparatus 10 of this embodiment is configured to fully transmit vibrations without detracting a low-profile design. The detailed configuration is explained below.

FIG. 6(A) is a top view when the base cover 90 of the lower housing 16*b* is seen from directly above, and FIG. 6(B) is a perspective view when the base cover 90 is seen from obliquely upward. As shown in FIG. 6(A) and FIG. 6(B), the base cover 90 is provided with a ring-shaped rib 92 for arranging the vibrating motor 66 at approximately the center. Strictly speaking, as shown in FIG. 6(A), the rib 92 is approximately the center of a horizontal direction and slightly upward of a vertical direction of the base cover 90. As well understood from FIG. 6(B), the rib 92 is made up of an upper member 920 and a lower member 922 different in amount of the protrusion (height).

Figure 9:
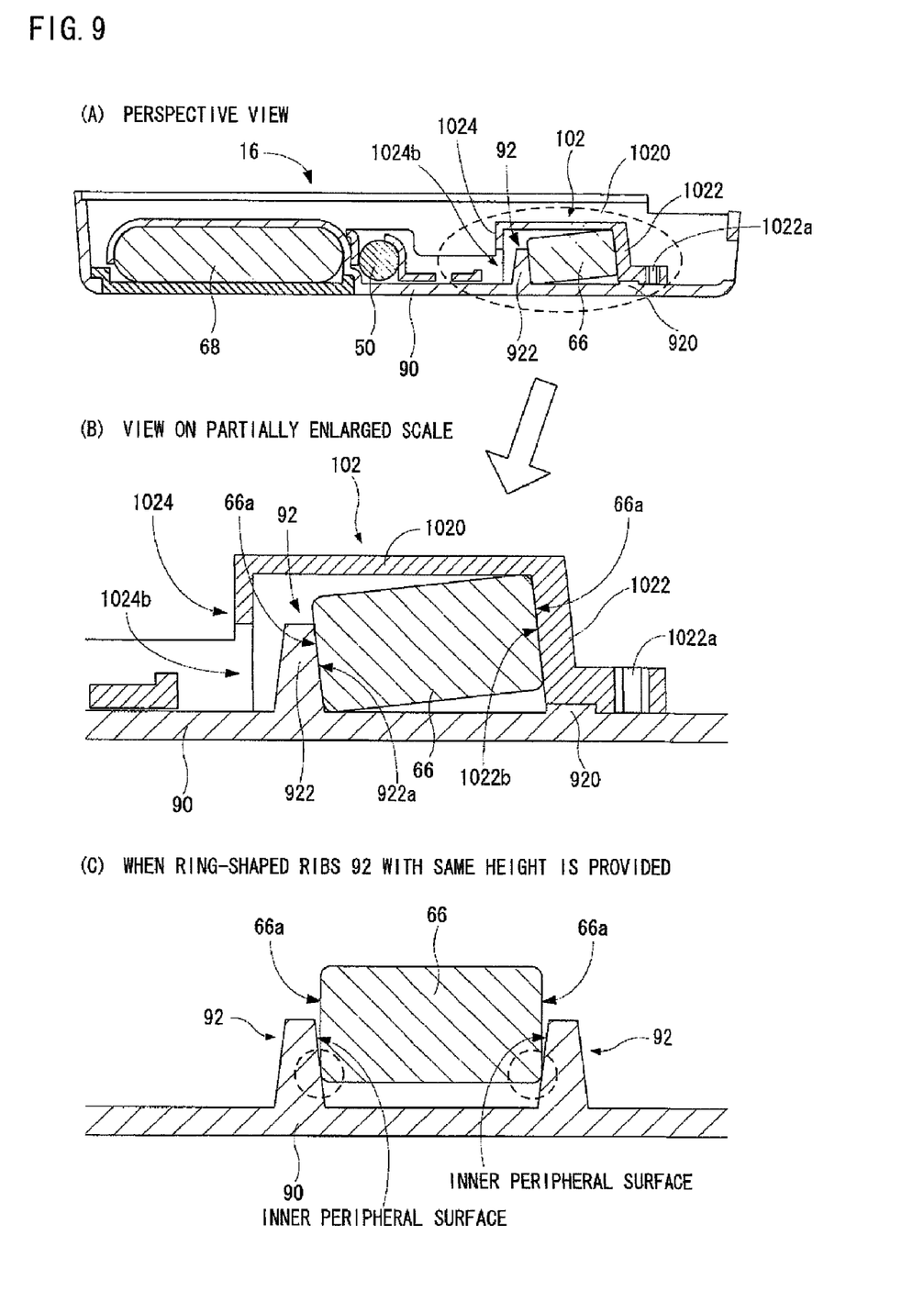
FIG. 9 is an illustrative view showing a cross-sectional view in FIG. 8, a view on an enlarged scale thereof, and a secured state of the motor when another base housing is formed.

Furthermore, the base cover 90 is provided with screw holes 94*a* and 94*b* for securing a motor cover 100 described later above and below the rib 92. In addition, on an upper surface (top side surface) of the base cover 90, the insertion opening 96*a* for inserting the above-described memory card 58 is provided. Then, the insertion opening 96*b* for the above-described externally-expanding connector 70 is provided next to the insertion opening 96*a* of the card slot 60 at approximately the center of the upper surface of the base cover 90. In addition, on a left side surface of the base cover 90, a through-hole 96*c* for the operating portion (not illustrated) of the volume switch 46*h* is provided, and an insertion opening 96*d* for inserting the SD card 64 is provided. Moreover, on a right side surface of the base cover 90, a through-hole 96*e* for the power button 46*f* is provided, and an insertion opening 96*f* for inserting the stick 50 is provided. In addition, the base cover 90 is formed with the battery housing box 98 for housing the battery 68 as a protruding on the rear side in a direction of the top surface (direction the same as a protruding direction of the rib 92) (see FIG. 9(A)).

Figure 7:
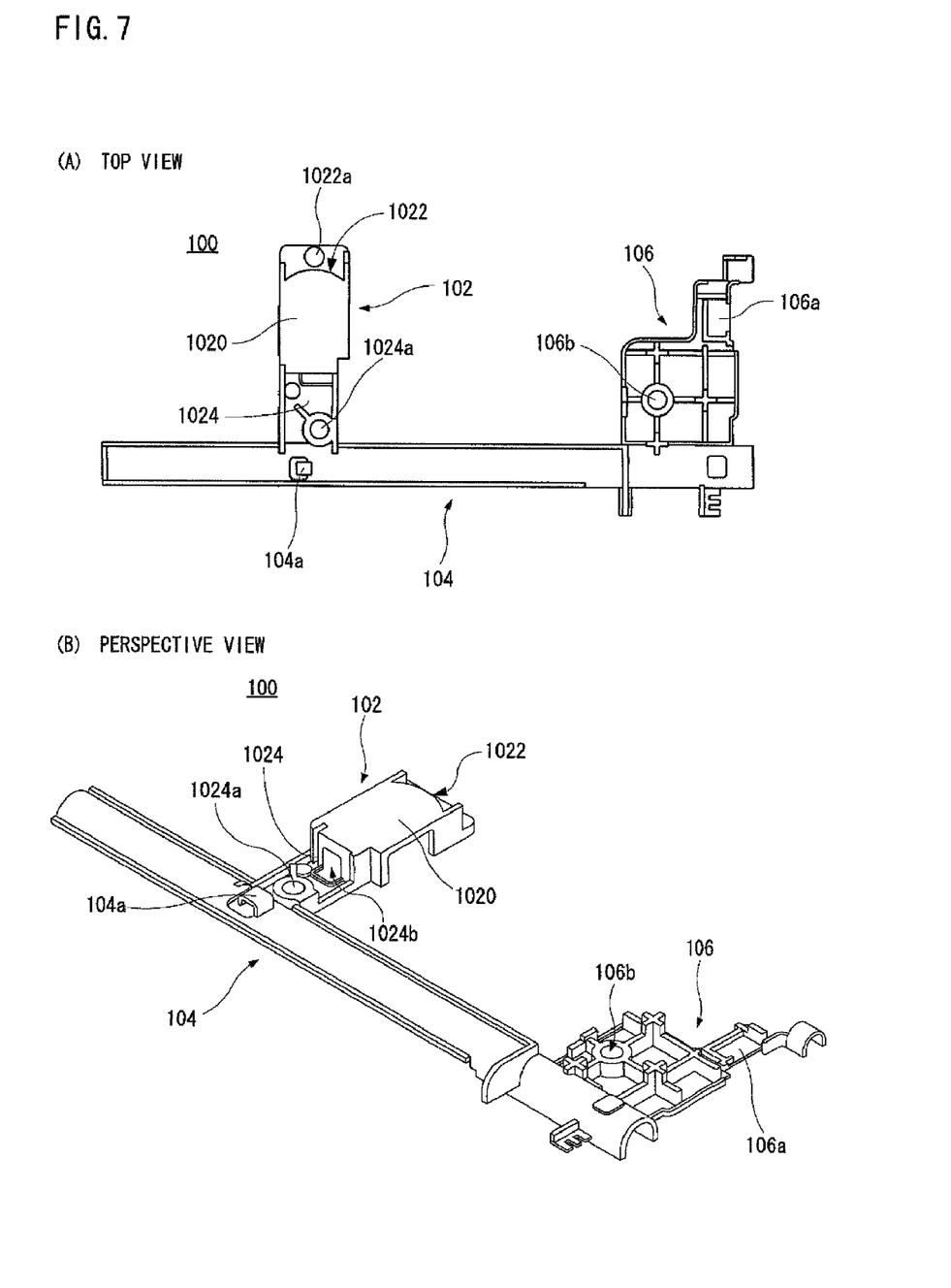
FIG. 7 is an illustrative view showing a configuration of a motor cover.

FIG. 7(A) is a top view when a motor cover 100 is seen from directly above, and FIG. 7(B) is a perspective view when the motor cover 100 is seen from obliquely upward. As shown in FIG. 7(A) and FIG. 7(B), the motor cover 100 is configured to connect a securing portion 102 for securing the vibrating motor 66, a stick holder portion 104 for forming a housing hole of the stick 50, and a button holder portion 106 for holding the power button 46.

As shown in FIG. 7(A) and FIG. 7(B), the securing portion 102 includes a top portion 1020 for restraining (covering) the vibrating motor 66, is provided with a rib 1022 for sandwiching the vibrating motor 66 integrated with the top portion 1020, and a connected portion 1024 to be connected with the stick holder portion 104 (see FIG. 9(A) and FIG. 9(B)) as described later. Furthermore, with respect to the securing portion 102, a through-hole 1022*a* for passing through a screw (not illustrated) by sandwiching the top portion 1020 is provided to the rib 1022, and a through-hole 1024*a* for passing through a screw is similarly provided to the connected portion 1024. In addition, to the connected portion 1024, a through-hole 1024*b* for passing through a wiring (lead wire) for the vibrating motor 66 is provided.

Figure 8:
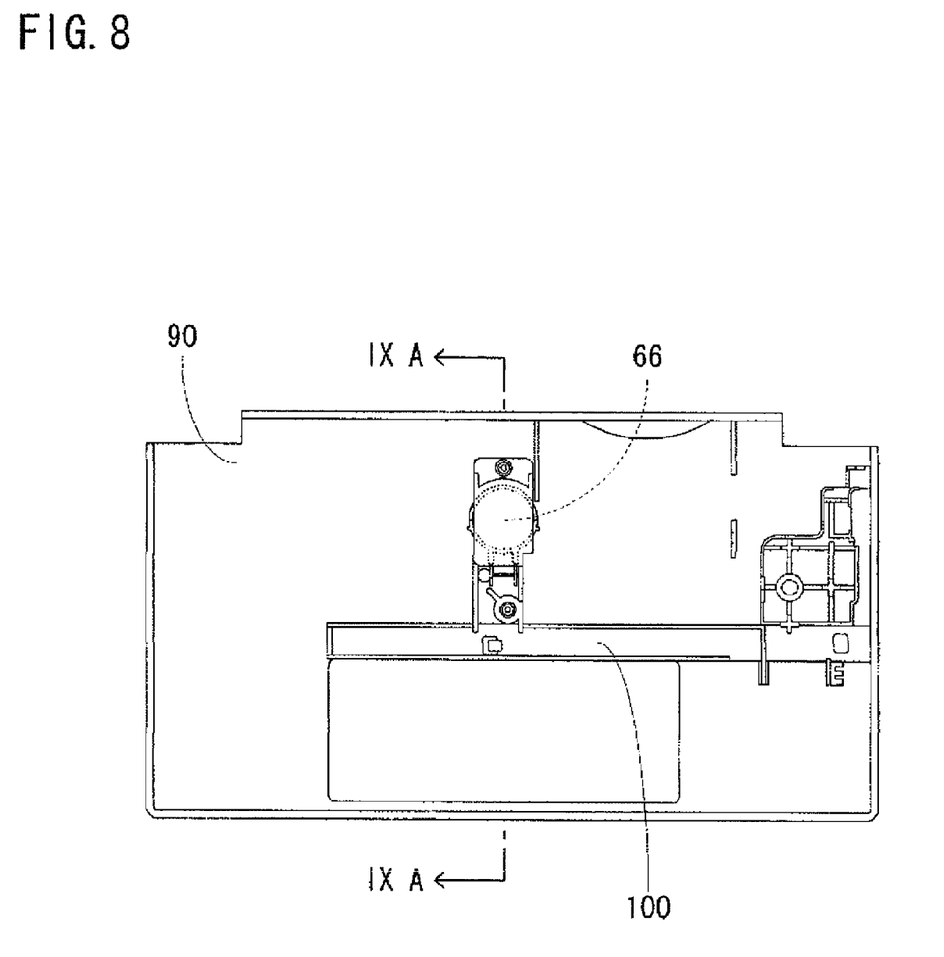
FIG. 8 is an illustrative view in which the motor cover is attached to the base cover to secure a vibrating motor.

Here, FIG. 8 shows an illustrative view showing a situation in which the vibrating motor 66 horizontally arranged is arranged at the position of the rib 92 of the base cover 90, and the motor cover 100 is attached to the base cover 90 with the vibrating motor 66 secured. Furthermore, FIG. 9(A) is a cross-sectional view taken along the line IXA-IXA of FIG. 8.

Referring to FIG. 9(A), as described above, it is found that each of the rib 1022 and the connected portion 1024 are formed to be integrated with the top portion 1020. As understood from FIG. 9(B) of a view on an enlarged scale showing a range encircled with dotted line in FIG. 9(A), the vibrating motor 66 horizontally arranged is sandwiched (held) by a side surface (inner peripheral surface) 922*a* of the above-described lower member 922 and a side surface (inner peripheral surface) 1022*b* of the rib 1022. Additionally, the side surface 922*a* and the side surface 1022*b* are in contact with a side surface 66*a* of the vibrating motor 66.

Here, the base cover 90 and the motor cover 100 are formed by injection molding, for example, and respectively has draft angles for removing the base cover 90 and the motor cover 100 from mold in the lower member 922 and the rib 1022. That is, as well understood from FIG. 9(B), the side surface 922*a* of the lower member 922 of the rib 92 and the side surface 1022*b* of the rib 1022 are slightly inclined with respect to the vertical (height) direction. In FIG. 9(A) and FIG. 9(B), in order to show the inclination of the side surface 922*a* of the lower member 922 and the inclination of the side surface 1022*b* of the rib 1022 more readily apparent, the inclination angle is made relatively larger, but in reality, the inclination angle is 0.5 degree-2 degrees with respect to the vertical direction. Furthermore, in a situation of FIG. 9(A) and FIG. 9(B), that is, in a situation in which the vibrating motor 66 is secured, an inclined direction of the side surface 922*a* of the lower member 922 and an inclined direction of the side surface 1022*b* of the rib 1022 are opposite directions, and the side surface 922*a* and the side surface 1022*b* are opposed to be in parallel or approximately parallel with each other. Accordingly, as described above, the side surface (inner peripheral surface) 922*a* of the lower member 922 and the side surface (inner peripheral surface) 1022*b* of the rib 1022 are in contact (intimate contact) with the side surface (outer surface) 66*a* of the vibrating motor 66. This makes it possible to efficiently transmit vibrations of the vibrating motor 66 (vibrations horizontally transmitted in FIG. 9(A) and FIG. 9(B)) to the lower housing 16*b*. Thus, it is possible to inform the player holding the lower housing 16*b* (game apparatus 10) of the aforementioned information.

Here, the ring-shaped rib 92 is formed in the same or approximately the same height over the full periphery, and when the vibrating motor 66 is sandwitched with the rib 92, the vibrating motor 66 is arranged as shown in FIG. 9(C) by the above-described draft angle of the mold. That is, as circled by a dotted line in FIG. 9(C), the side surface 66a of the vibrating motor 66 and an inner peripheral surface of the rib 92 are brought into contact at a point. In such a case, the vibrations of the vibrating motor 66 are hard to be transmitted to the lower housing 16b.

Thus, it is impossible to efficiently inform the player of the information as described. Accordingly, as shown in FIG. 9(A) and FIG. 9(B), the vibrating motor 66 is configured to be sandwiched between the rib 92 (lower member 922) of the base cover 90 and the rib 1022 provided to the securing portion 102 of the motor cover 100.

It should be noted that the reason why the rib 1022 and the connected portion 1024 are separately provided at the motor cover 100 is that when the entire portion of the side surface 66a of the vibrating motor 66 are covered with the rib 1022 and the connected portion 1024 similar to a case that the ring-shaped rib 92 shown in FIG. 9(C) is formed, the side surface 66a of the vibrating motor 66 may not be in contact with the side surface 1022b of the rib 1022 and the side surface 922a of the lower member 922.

Returning to FIG. 7(A) and FIG. 7(B), the stick holder 104 is of semi-circle or inverted U-form in cross section and formed to be straightly extended. Accordingly, as shown in FIG. 8, when the motor cover 100 is attached to the base cover 90, although illustration is omitted, the housing hole 52 is formed by the insertion opening 96f of the base cover 90, and a hole is formed by the inner surface of the base cover 90 and on the inner surface of the motor cover 100. Furthermore, the stick holder 104 has a hook 104a in the vicinity of the connected portion with the securing portion 102. The hook 104a hooks a lead wire of the vibrating motor 66, and bent to a direction in which the stick holder 104 extends (longitudinal direction). The lead wire is thus hooked by the hook 104, thus avoiding any inconvenience of the lead wire to the assembly of the game apparatus 10 and making the wiring easy.

Additionally, as shown in FIG. 7(A) and FIG. 7(B), the button holder 106 is provided with a holder 106a for securely holding a main body of the power button 46f (not illustrated). Moreover, the button holder 106 is provided with a through hole 106b for passing through a screw (not illustrated) when the motor cover 100 is secured to the base cover 90.

Figure 10:
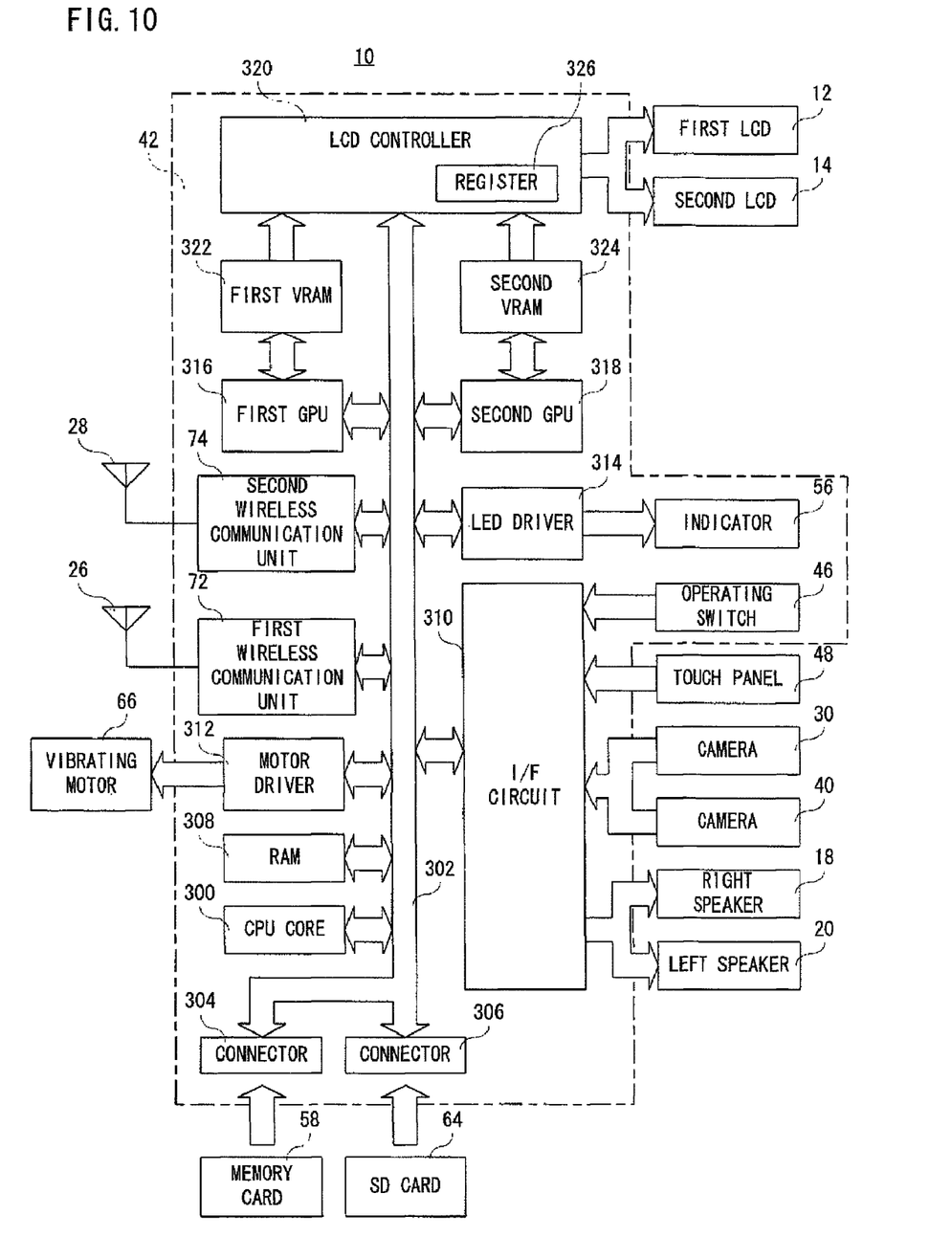
FIG. 10 is a block diagram showing an electric configuration of the game apparatus shown in FIG. 1.

FIG. 10 is a block diagram of an electric configuration of the game apparatus 10 as described above. Referring to FIG. 10, the game apparatus 10 includes the above-described circuit board 42, and on the circuit board 42 is mounted with circuit components like a CPU core 300, etc. For the sake of drawing, in FIG. 10, parts of components, such as the battery 68, the externally-expanding connector 70, the power supply circuit are omitted.

As shown in FIG. 10, the CPU core 300 is connected to connectors 304, 306 via a bus 302, and connected to a RAM 308, an input-output interface circuit (hereinafter referred to as "I/F circuit") 310, a motor driver 312, a first wireless communication unit 72, a second wireless communication unit 74, an LED driver 314, a first graphics processing unit (GPU) 316, a second GPU 318 and an LCD controller 320.

The connector 304 is detachably connected with the memory card 58 as described above. Furthermore, the connector 306 is detachably connected with the SD card 64 as described above. Accordingly, the CPU core 300 can access a ROM and a RAM not shown within the memory card 58, and can access a flash memory not shown within the SD card 64.

The RAM 308 is a main memory to be used as a working area and a buffer area of the CPU core 300. The I/F circuit 310 is connected with the operating switch 46, the touch panel 48, the cameras 30, 40 and the speakers 18, 20. Here, the operating switch 46 is the above-described switches 46a, 46b, 46c, 46d, 46e, 46f, 46g, 46h, 46i, 46j, 46L and 46R. When the operating switch 46 is operated, a corresponding operation signal (operation data) is input to the CPU core 300 via the I/F circuit 310.

Furthermore, coordinate data from the touch panel 48 is input to the CPU core 300 via the I/F circuit 310. In addition, imaged image data from the cameras 30, 40 are input to the CPU core 300 via the I/F circuit 310. Although illustration is omitted, the CPU core 300 separately controls the imaging by the cameras 30, 40 according to an instruction from the player. Furthermore, although illustration is omitted, the CPU core 300 applies a control signal (control voltage) as to lighting, extinction and flashing of the LED 32 placed in the vicinity of the camera 30 via the I/F circuit 310. Moreover, the CPU core 300 reads sound data required for the game, such as a game music (BGM), a sound effect or a voice (onomatopoeic sound) of a game character, etc. from the RAM 308, and outputs the same through the speakers 18, 20 via the I/F circuit 310.

The motor driver 312 controls the driving of the vibrating motor 66 under the control of the CPU core 300. For example, the motor driver 312c converts the control signal (drive pulse) applied from the CPU core 300 to a drive power, and applies the converted drive power to the vibrating motor 66. Thus, the vibrating motor 66 is driven.

The first wireless communication unit 72 is a wireless LAN module like Wi-Fi, and connected to the above-described antenna 26. Furthermore, the second wireless communication unit 74 is a module as to a short distance wireless communication, like Bluetooth (registered trademark), and connected to the above-described antenna 28.

The LED driver 314 is connected to the above-described indicator 56. The LED driver 314 separately controls lighting, extinction, and flashing of the respective LEDs included in the indicator 56 in response to an instruction from the CPU core 300.

Each of the GPU 316 and GPU 318 forms a part of a drawing means, is constructed by, for example, a single chip ASIC, and receives a graphics command (drawing instruction) from the CPU core 300 to generate image data according to the graphics command. Here, the CPU core 300 applies an image generation program (included in the game program, for example) required to generate the image data to both of the GPU 316 and the GPU 318 in addition to the graphics command.

Furthermore, the GPU 316 is connected with a first video RAM (hereinafter referred to as "VRAM") 322, and the GPU 318 is connected with a second VRAM 324. The GPU 316 and the GPU 318 respectively access the first VRAM 322 and the second VRAM 324 to obtain data (image data: polygon data, texture data, etc.) required to execute a graphics command.

It should be noted that the CPU core 300 writes image data necessary for drawing to the first VRAM 322 and the second the VRAM 324 via the GPU 316 and the GPU 318. The GPU 316 accesses the first VRAM 322 to produce image data necessary for drawing and the GPU 318 accesses the second VRAM 324 to produce image data for drawing.

The VRAM 322 and the VRAM 324 are connected to the LCD controller 320. The LCD controller 320 includes a register 326, and the register 326 consists of, for example, one bit, and stores a value of "0" or "1" (data value) according to an instruction of the CPU core 300. The LCD controller 320 outputs the image data produced by the GPU 316 to the LCD 12, and outputs the image data produced by the GPU 318 to the LCD 14 in a case that the data value of the register 326 is "0". Furthermore, the LCD controller 320 outputs the image data produced by the GPU 316 to the LCD 14, and outputs the image data produced by the GPU 318 to the LCD 12 in a case that the data value of the register 326 is "1".

It should be noted that the LCD controller 320 directly reads image data from the VRAM 322 and the VRAM 324, and reads image data from the VRAM 322 and the VRAM 324 via the GPU 316 and the GPU 318.

According to this embodiment, the vibrating motor is sandwiched between the side surface of the lower member of the rib provided to the base cover and the side surface of the rib of the securing portion of the motor cover which is opposed to be in parallel with each other, so that the side surface of the vibrating motor is brought into contact with the side surfaces of the respective ribs. Thus, it is possible to efficiently transmit vibrations of the vibrating motor to the housing.

It should be noted that in this embodiment, as a hand-held type information processing apparatus, an explanation is made on the hand-held type game apparatus, but there is no need of being restricted thereto. This can be applied to various hand-held information processing apparatuses, such as a game controller, a PDA, a hand-held sound recording and reproducing apparatus, an electronic data book, a cellular phone, etc.

Additionally, the configuration of the game apparatus should not be restricted to that of the above-described embodiment. For example, the LCD is enough for one, or the touch panel may be provided to both of the two LCDs.

Although the present embodiment has been described and illustrated in detail, it is clearly understood that the same is by way of illustration and example only and is not to be taken by way of limitation, the spirit and scope of the present embodiment being limited only by the terms of the appended claims.

What is claimed is:

1. A hand-held information processing apparatus, comprising:
    a coin-shaped vibrating motor;
    a housing provided with a first rib having an inclined side surface; and
    a cover provided with a second rib having a side surface which is opposed to be in parallel or approximately parallel with said side surface of said first rib for restraining said coin-shaped vibrating motor, wherein
    said cover is attached to said housing such that a side surface of said coin-shaped motor horizontally arranged is sandwiched between said side surface of said first rib and said side surface of said second rib and in contact with said side surface of said first rib and said side surface of said second rib.

2. The hand-held information processing apparatus according to claim 1, wherein
    said cover has a hook to be used for wiring of said coin-shaped vibrating motor.

3. The hand-held information processing apparatus according to claim 1, wherein
    said housing and said cover form a housing hole to house a pen for a touch panel.

4. The hand-held information processing apparatus according to claim 1, wherein
    said housing further includes a through-hole to pass through a pushed portion of a switch, and
    said cover further includes a holding portion to hold said switch.

5. The hand-held information processing apparatus according to claim 1, wherein
    the housing and the cover include inner surfaces that oppose each other and are at least substantially parallel with each other, and wherein the top and bottom surfaces of the coin-shaped motor are arranged at an angle with respect to said inner surfaces of the housing and the cover.

* * * * *